United States Patent
Senthilkumar

(10) Patent No.: US 9,276,817 B2
(45) Date of Patent: Mar. 1, 2016

(54) METHOD FOR DETERMINING NETWORK TOPOLOGY

(71) Applicant: Hewlett-Packard Development Company, L.P., Houston, TX (US)

(72) Inventor: Karthikeyan Senthilkumar, Bangalore (IN)

(73) Assignee: Hewlett Packard Enterprise Development LP, Houston, TX (US)

(*) Notice: Subject to any disclaimer, the term of this patent is extended or adjusted under 35 U.S.C. 154(b) by 264 days.

(21) Appl. No.: 14/021,755

(22) Filed: Sep. 9, 2013

(65) Prior Publication Data

US 2015/0019712 A1   Jan. 15, 2015

(30) Foreign Application Priority Data

Jul. 12, 2013  (IN) .......................... 3114/CHE/2013

(51) Int. Cl.
*H04L 12/26* (2006.01)
*H04L 12/24* (2006.01)

(52) U.S. Cl.
CPC ............... *H04L 41/12* (2013.01); *H04L 43/045* (2013.01)

(58) Field of Classification Search
CPC .............................. H04L 41/12; H04L 43/045
See application file for complete search history.

(56) References Cited

U.S. PATENT DOCUMENTS

| | | | |
|---|---|---|---|
| 8,356,093 B2* | 1/2013 | Koizumi et al. | 709/223 |
| 2002/0075809 A1* | 6/2002 | Phaal | 370/245 |
| 2009/0003336 A1 | 1/2009 | Daines et al. | |
| 2011/0216670 A1* | 9/2011 | Sriranganath et al. | 370/255 |
| 2013/0148547 A1 | 6/2013 | Page et al. | |

FOREIGN PATENT DOCUMENTS

EP    1780943    5/2007

OTHER PUBLICATIONS

SolarWlnds, 2008. "LAG-MIB: RFC Link Aggregation" Retrieved on Jul. 26, 2015 from <https://support.ipmonitor.com/mibs/LAG-MIB/tree.aspx>.*

"What's New in VMware vSphere 5.1—Networking", Jun. 2012, http://www.vmware.com/files/pdf/techpaper/Whats-New-VMware-vSphere-5 1-Network-Technical-Whitepaper.pdf.

* cited by examiner

*Primary Examiner* — Brian J. Gillis
*Assistant Examiner* — Juan C Turriate Gastulo
(74) *Attorney, Agent, or Firm* — Mannava & Kang, P.C

(57) ABSTRACT

Presented is a method of determining network topology. A determination is made whether a remote port on a first network device for establishing a layer 2 connection is an aggregate port. If the remote port is an aggregate port, identify the aggregate port and a coupled second network device based on Management Information Base (MIB) attributes. Identify a base port of the second network device from the aggregate port on the first network device, and a local interface index number corresponding to the identified base port from a mapping between local interface index numbers and corresponding base ports of the second network device.

11 Claims, 2 Drawing Sheets

METHOD FOR DETERMINING NETWORK TOPOLOGY

CLAIM FOR PRIORITY

The present application claims priority under 35 U.S.C 119(a)-(d) to Indian Patent application number 3114/CHE/2013, filed on Jul. 12, 2013, which is incorporated by reference herein in its entirety.

BACKGROUND

A network topology is the basic design of a computer network. It details how key network components such as nodes and links are interconnected. Network topologies may be physical or logical. Physical topology means the physical design of a network including the devices, cable installation, etc. Logical topology refers to how data is actually transferred in a network. The information of network topologies is essential for purposes such as load redistributing, network monitoring, routing, etc.

BRIEF DESCRIPTION OF THE DRAWINGS

For a better understanding of the invention, embodiments will now be described, purely by way of example, with reference to the accompanying drawings, in which.

DETAILED DESCRIPTION OF THE INVENTION

The Open Systems Interconnection (OSI) model is a conceptual model that describes how messages should be sent from one device to another over a network. The OSI model defines seven layers of functions that take place at each end of a communication. Layer 2 or "data link layer" is the second layer of the OSI model. The data link layer performs various functions such as segmentation, bit assembly, communication with the network layer, etc.

In the context of a network management system (NMS), deriving layer 2 connectivity information is relied upon either by private management information base (MIB) implementations of the vendor or by standard Simple Network Management (SNMP) Bridge-MIB. For example, in the Cisco switches that support VLAN, the standard BRIDGE-MIB is implemented using VLAN indexed community string in order to provide access for every instance of the BRIDGE-MIB for each VLAN in the switch. These instances of BRIDGE-MIB form the vital information for the management system to compute the network topology of the devices.

Thus, layer 2 connections between network devices may be based on information deduced from sources such as SNMP based MIBs or configuration protocols. While configuration protocols may be proprietary to a vendor, MIB-II standard in SNMP provides a system to deduce the details across multiple vendors, for instance, through Bridge MIB objects defined in Request for Comment 1493 (RFC 1493). Bridge MIB objects report the interface Media Access Control (MAC) addresses of the connected interface of the neighboring devices. However, in case of duplicate MAC addresses (shared MAC) configured on the interfaces in a network device, Bridge-MIB does not accurately determine the layer 2 connections across devices to the specific interface. In order to obtain accurate network topology information, it is imperative to compute the exact interface amongst the list of interfaces having shared MAC addresses that is connected to the other interface of the device in the layer 2 topology.

Embodiments of the present invention provide a method of determining network topology of a network.

For clarity and convenience, the term "network topology", as used herein, may refer to physical and/or logical arrangement of network nodes in a computer network.

Figure 1:
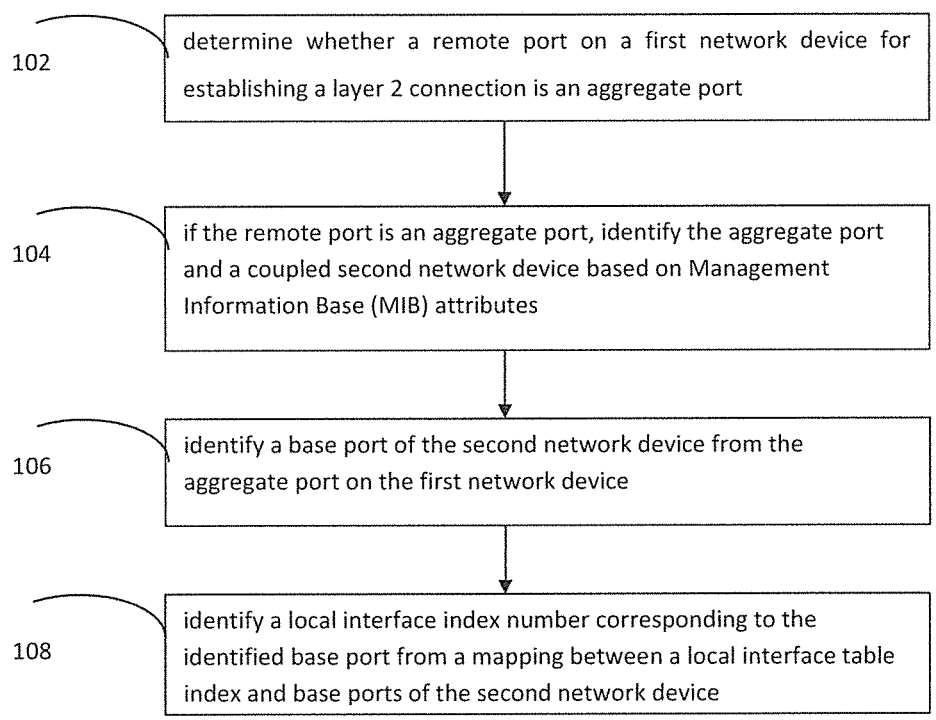
FIG. 1 shows a flow chart of a method of determining network topology of a network, according to an example.

FIG. 1 shows a flow chart of a method of determining network topology of a network, according to an example. At block 102, a determination is made whether a remote port on a first network device in a computer network for establishing a layer 2 connection is an aggregate port. In other words, a remote port (to which the Layer 2 connection is to be drawn) on a network device is selected for determining whether the selected remote port is an individual port or an aggregate port. As known, link aggregation is method of using two or more ports in parallel to achieve greater throughput or to set up a network fault tolerance. It allows multiple ports to merge logically in a single link. Link aggregation may be achieved through Cisco's proprietary Port Aggregation Protocol (PAgP) or IEEE's standard Link Aggregation Protocol (LACP). In an implementation, an aggregate port is identified through MIB attribute: dot3adAgg PortAggregateOrIndividual.

If upon determination at block 102, a remote port is identified as an aggregate port, the aggregate port is identified along with a coupled second network device (block 104). In other words, the "identity" of the remote port (or "aggregate port") is determined along with the identity of another network device coupled to the first network device. In an implementation, aforesaid identification is based on Management Information Base (MIB) attributes: Dot3ad AggPortPartnerOperPort and dot3adAggPortPartnerOperSystemID respectively. The MIB attributes may be obtained from the first network device.

In an implementation, prior to identification of the remote port, the administrative and operational states of the remote port is verified by validating MIB attributes: dot3adAggPortPartnerAdminState and dot3adAggPortPartnerOperState. It is only after the verification that the administrative and operational states of the remote port are "UP" or "active" that the "identification" of the remote port may take place. An operational "UP" state of a remote port may mean to include that the remote port is functioning. An administrative "UP" state of a remote port may mean to include that the remote port is under active usage, and a network administrator has not disabled its usage.

At block 106, a base port of the second network device (identified at block 104) is identified from the aggregate port on the first network device. In an implementation, the base port of the second network device is the aggregate port of the first network device.

At block 108, a local interface index number corresponding to the identified base port is identified from a mapping between a local interface table index and base ports of the second network device.

Each network interface in a computing device (such as a network device) can be represented by an individual interface index number. A local interface table index captures interface index number of a network interface in a computing device. In the present case, a mapping is generated between interface index numbers and their corresponding base ports in the second network device. An example illustrating such mapping is provided in Table 1 below.

TABLE 1

| Base port | Interface Index number |
|---|---|
| 1 | 1000 |
| 2 | 2000 |
| 3 | 3000 |

In an implementation, the local interface index table of the second network device is obtained from the Link aggregation MIB data. The Link aggregation MIB provides information regarding remote ports and remote systems on which the aggregation is bound.

Once a mapping is generated between interface index numbers and their corresponding base ports in the second network device, a local interface index number corresponding to the base port (identified at block 106) is identified from the mapping. Upon such identification, a Layer 2 connection may be drawn between the first network device and the second network device. In an implementation, said Layer 2 connection may be illustrated in the form of a Graphical User Interface (GUI), which may be displayed on a display device such as a computer monitor.

Figure 2:
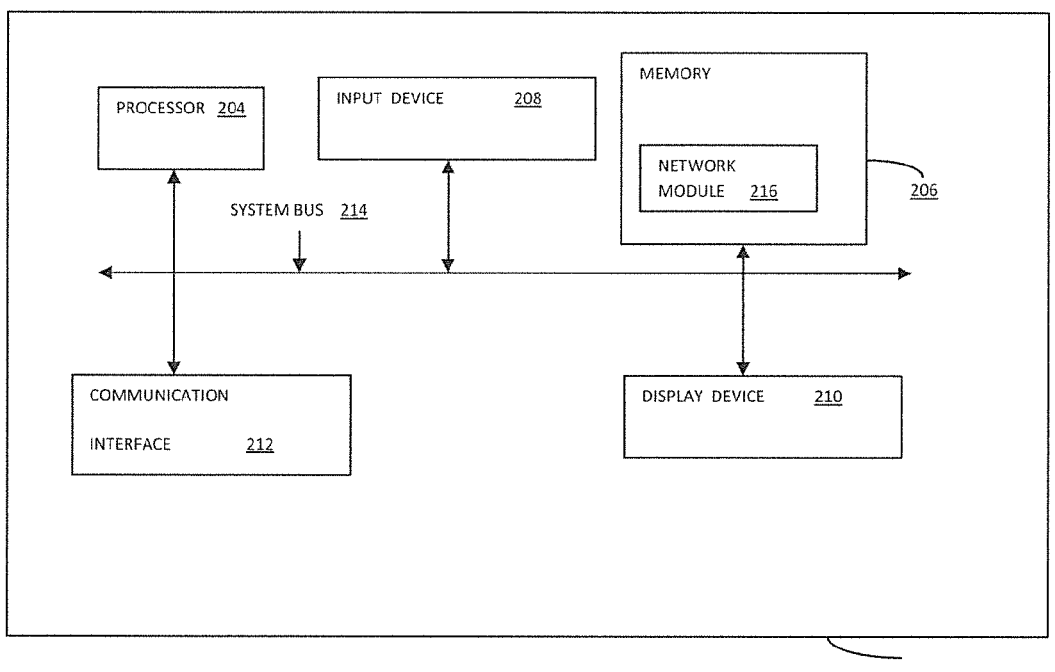
FIG. 2 shows a block diagram of a computer system for implementing an embodiment, according to an example.

FIG. 2 shows a block diagram of a computer system for implementing an embodiment, according to an example.

Computer system 202 may be a computer server, network switch, router, desktop computer, notebook computer, tablet computer, mobile phone, or the like.

Computer system 202 may include processor 204, memory 206, input device 208, display device 210, and communication interface 212. The components of the computing system 202 may be coupled together through a system bus 214.

Processor 204 may include any type of processor, microprocessor, or processing logic that interprets and executes instructions.

Memory 206 may include a random access memory (RAM) or another type of dynamic storage device that may store information and instructions non-transitorily for execution by processor 204. For example, memory 206 can be SDRAM (Synchronous DRAM), DDR (Double Data Rate SDRAM), Rambus DRAM (RDRAM), Rambus RAM, etc. or storage memory media, such as, a floppy disk, a hard disk, a CD-ROM, a DVD, a pen drive, etc.

Memory 206 includes network module 216. In an implementation, network module 216 (machine executable instructions) determines whether a remote port on a first network device, for establishing a layer 2 connection, is an aggregate port. If the remote port is an aggregate port, network module 216 identifies the aggregate port and a coupled second network device based on Management Information Base (MIB) attributes. It then identifies a base port of the second network device from the aggregate port on the first network device, and a local interface index number corresponding to the identified base port from a mapping between a local interface table index and base ports of the second network device.

Network module 216 may be implemented in the form of a computer program product including computer-executable instructions, such as program code, which may be run on any suitable computing environment in conjunction with a suitable operating system, such as Microsoft Windows, Linux or UNIX operating system. In an implementation, network module 216 may be installed on a computer system. In a further implementation, network module 216 may be read into memory 206 from another computer-readable medium, such as data storage device, or from another device via communication interface 212.

Communication interface 212 may include any transceiver-like mechanism that enables computing device 202 to communicate with other devices and/or systems via a communication link. Communication interface 212 may be a software program, a hard ware, a firmware, or any combination thereof. Communication interface 212 may use a variety of communication technologies to enable communication between computer server and another computing device. To provide a few non-limiting examples, communication interface may be an Ethernet card, a modem, an integrated services digital network ("ISDN") card, a network port (such as a serial port, a USB port, etc.) etc.

Input device 208 may include a keyboard, a mouse, a touch-screen, or other input device. Display device 210 may include a liquid crystal display (LCD), a light-emitting diode (LED) display, a plasma display panel, a television, a computer monitor, and the like.

It would be appreciated that the system components depicted in FIG. 2 are for the purpose of illustration only and the actual components may vary depending on the system and architecture deployed for implementation of the present solution.

Solution described in this application may be implemented in the form of a computer program product including computer-executable instructions, such as program code, which may be run on any suitable computing environment in conjunction with a suitable operating system, such as Microsoft Windows, Linux or UNIX operating system. Embodiments within the scope of the present solution may also include program products comprising transitory or non-transitory processor-readable media for carrying or having computer-executable instructions or data structures stored thereon. Such processor-readable media can be any available media that can be accessed by a general purpose or special purpose computer. By way of example, such processor-readable media can comprise RAM, ROM, EPROM, EEPROM, CD-ROM, magnetic disk storage or other storage devices, or any other medium which can be used to carry or store desired program code in the form of computer-executable instructions and which can be accessed by a general purpose or special purpose computer.

For the sake of clarity, the term "module", as used in this document, may mean to include a software component, a hardware component or a combination thereof. A module may include, by way of example, components, such as software components, processes, tasks, co-routines, functions, attributes, procedures, drivers, firmware, data, databases, data structures, Application Specific Integrated Circuits (ASIC) and other computing devices. The module may reside on a volatile or non-volatile storage medium and configured to interact with a processor of a computer system.

It should be noted that the above-described embodiment of the present solution is for the purpose of illustration only. Although the solution has been described in conjunction with a specific embodiment thereof, numerous modifications are possible without materially departing from the teachings and advantages of the subject matter described herein. Other substitutions, modifications and changes may be made without departing from the spirit of the present solution.

The invention claimed is:

1. A method of determining network topology, comprising:
    determining whether a remote port on a first network device for establishing a layer 2 connection is an aggregate port;
    in response to a determination that the remote port is an aggregate port, identifying the aggregate port and a coupled second network device based on Management Information Base (MIB) attributes obtained from the first network device;

identifying a base port of the second network device from the aggregate port on the first network device;

identifying a local interface index number corresponding to the identified base port from a mapping between local interface index numbers and corresponding base ports of the second network device, wherein the mapping between local interface index numbers and corresponding base ports of the second network device is stored in a local interface table index of the second network device, and wherein the local interface table index of the second network device is obtained from the MIB attributes obtained from the first network device; and establishing the layer 2 connection between the first network device and the second network device.

2. The method of claim 1, further comprising generating the mapping between the local interface index numbers and the corresponding on the second network device.

3. The method of claim 1, further comprising displaying the layer 2 connection between the first network device and the second network device in a Graphical User Interface (GUI).

4. The method of claim 1, wherein the determination whether the remote port on the first network device for establishing the layer 2 connection is the aggregate port is made using an MIB attribute: dot3adAggPortAggregateOrIndividual.

5. The method of claim 1, further comprising determining whether the aggregate port is operationally active.

6. The method of claim 1, wherein the aggregate port is identified using an MIB attribute: dot3adAggPortPartnerOperPort.

7. The method of claim 1, wherein the coupled second network device is identified using an MIB attribute: dot3adAggPortPartnerOperSystemID.

8. A non-transitory processor readable medium, the non-transitory processor readable medium comprising machine executable instructions, the machine executable instructions when executed by a processor causes the processor to:

determine whether a remote port on a first network device for establishing a layer 2 connection is an aggregate port;

in response to a determination that the remote port is an aggregate port, identify the aggregate port and a coupled second network device based on Management Information Base (MIB) attributes obtained from the first network device;

identify a base port of the second network device from the aggregate port on the first network device;

identify a local interface index number corresponding to the identified base port from a mapping between a local interface index numbers and corresponding base ports of the second network device, wherein the mapping between local interface index numbers and corresponding base ports of the second network device is stored in a local interface table index of the second network device, and wherein the local interface table index of the second network device is obtained from the MIB attributes obtained from the first network device; and establish the layer 2 connection between the first network device and the second network device.

9. The medium of claim 8, further comprising machine readable instructions that causes the processor to establish the layer 2 connection between the first network device and the second network device.

10. The medium of claim 9, further comprising machine readable instructions that causes the processor to display the layer 2 connection between the first network device and the second network device in a Graphical User Interface (GUI).

11. The medium of claim 9, further comprising machine readable instructions that causes the processor to display the layer 2 connection between the first network device and the second network device on a display device.

* * * * *